(12) United States Patent
Wangard et al.

(10) Patent No.: US 7,899,488 B2
(45) Date of Patent: Mar. 1, 2011

(54) METHOD AND APPARATUS FOR EXTENDING NETWORK DISCOVERY RANGE

(75) Inventors: William E. Wangard, Lake Zurich, IL (US); Timothy A. Dickinson, Crystal Lake, IL (US); Robert M. Johnson, Lake Zurich, IL (US); Arthur C. Leyh, Spring Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1248 days.

(21) Appl. No.: 11/496,938

(22) Filed: Jul. 31, 2006

(65) Prior Publication Data

US 2008/0026718 A1    Jan. 31, 2008

(51) Int. Cl.
*H04M 1/00* (2006.01)
(52) U.S. Cl. .................. 455/552.1; 455/266; 455/452.2; 455/513
(58) Field of Classification Search .................. 455/266, 455/428, 445, 450–451, 452.1, 452.2, 454, 455/500–501, 504, 513, 63.1, 552.1, 553.1, 455/115.1, 115.3, 132–135, 67.11, 67.13
See application file for complete search history.

(56) References Cited

U.S. PATENT DOCUMENTS

| 4,352,208 | A | 9/1982 | Schroeder |
| 4,563,651 | A | 1/1986 | Ohta |
| 4,977,611 | A | 12/1990 | Maru |
| 5,257,400 | A | 10/1993 | Yoshida |
| 5,511,235 | A | 4/1996 | Duong |
| 5,943,613 | A | 8/1999 | Wendelrup |
| 5,949,832 | A | 9/1999 | Liebetreu |
| 6,061,575 | A | 5/2000 | Lombardi |
| 6,064,665 | A * | 5/2000 | Leuck et al. .................. 370/335 |
| 6,134,282 | A | 10/2000 | Ben-Efraim |
| 6,150,987 | A | 11/2000 | Sole |
| 6,205,334 | B1 | 3/2001 | Dent |
| 6,229,991 | B1 | 5/2001 | Hietala |
| 6,275,542 | B1 | 8/2001 | Katayama |
| 6,393,284 | B1 | 5/2002 | Dent |
| 6,434,186 | B2 | 8/2002 | Dowling |
| 6,480,709 | B2 | 11/2002 | Phang et al. |
| 6,553,229 | B1 | 4/2003 | Dent |
| 6,693,977 | B2 | 2/2004 | Katayama |
| 6,721,298 | B1 | 4/2004 | Vella-Coleiro |
| 6,741,844 | B2 | 5/2004 | Medvid |
| 6,748,198 | B1 | 6/2004 | Salo |
| 7,103,374 | B2 * | 9/2006 | Yla-Jaaski et al. ........... 455/502 |
| 2004/0044887 | A1 | 3/2004 | Park |
| 2008/0186137 | A1 * | 8/2008 | Butler et al. .................. 340/10.1 |

* cited by examiner

*Primary Examiner* — Pablo N Tran (57) ABSTRACT

A method and apparatus for power conservation is provided for a multi-mode wireless communication device (100) capable of operating in a plurality of networks, each of the plurality of networks having a network signal with predetermined spectral characteristics. The wireless communication device (100) includes a variable bandwidth signal detector (140), a threshold detector (145), and a controller (120). The variable bandwidth signal detector (140) receives radio frequency (RF) signals and defines a detection bandwidth for signal detection. The threshold detector (145) is coupled to the variable bandwidth signal detector (140) and detects a network signal within the RF signals in response to determining whether a signal is present within the detection bandwidth having a signal strength greater than a predetermined signal strength. The controller (120) is coupled to the variable bandwidth signal detector (140) and the threshold detector (145) and offsets a center of the detection bandwidth of the variable bandwidth signal detector (140) in response to the predetermined spectral characteristics of the network signal.

29 Claims, 5 Drawing Sheets

METHOD AND APPARATUS FOR EXTENDING NETWORK DISCOVERY RANGE

FIELD OF THE INVENTION

The present invention generally relates to wireless communication systems, and more particularly relates to a method and apparatus for conserving power and extending network discovery ranges during times of network discovery in wireless communication devices.

BACKGROUND OF THE INVENTION

Multi-mode wireless communication devices are being provided with the ability to receive wireless communications in a variety of radio access technologies in more than one wireless communication system. For example, wireless communication devices capable of cellular communications over cellular networks are also being provided the additional wireless communication modes to permit alternate radio access technology communication over networks such as wireless wide area networks (WANs) and wireless local area networks (WLANs). However, implementing such additional modes of wireless communication in a portable wireless communication device requires speed of detection of the alternate network for voice continuation during an active call. In addition, quick detection must occur with minimal current drain to reduce impact of implementing the alternate radio access technology on standby battery life.

Thus, what is needed is a method and apparatus for reducing current drain during network access and increasing network detection range while increasing the speed of network discovery. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method for detection of a network having a network signal with predetermined spectral characteristics in accordance with the present invention includes the steps of offsetting a center of a detection bandwidth for signal detection in response to the predetermined spectral characteristics of the network signal and determining whether a signal is present within the detection bandwidth having a signal strength greater than a predetermined signal strength The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
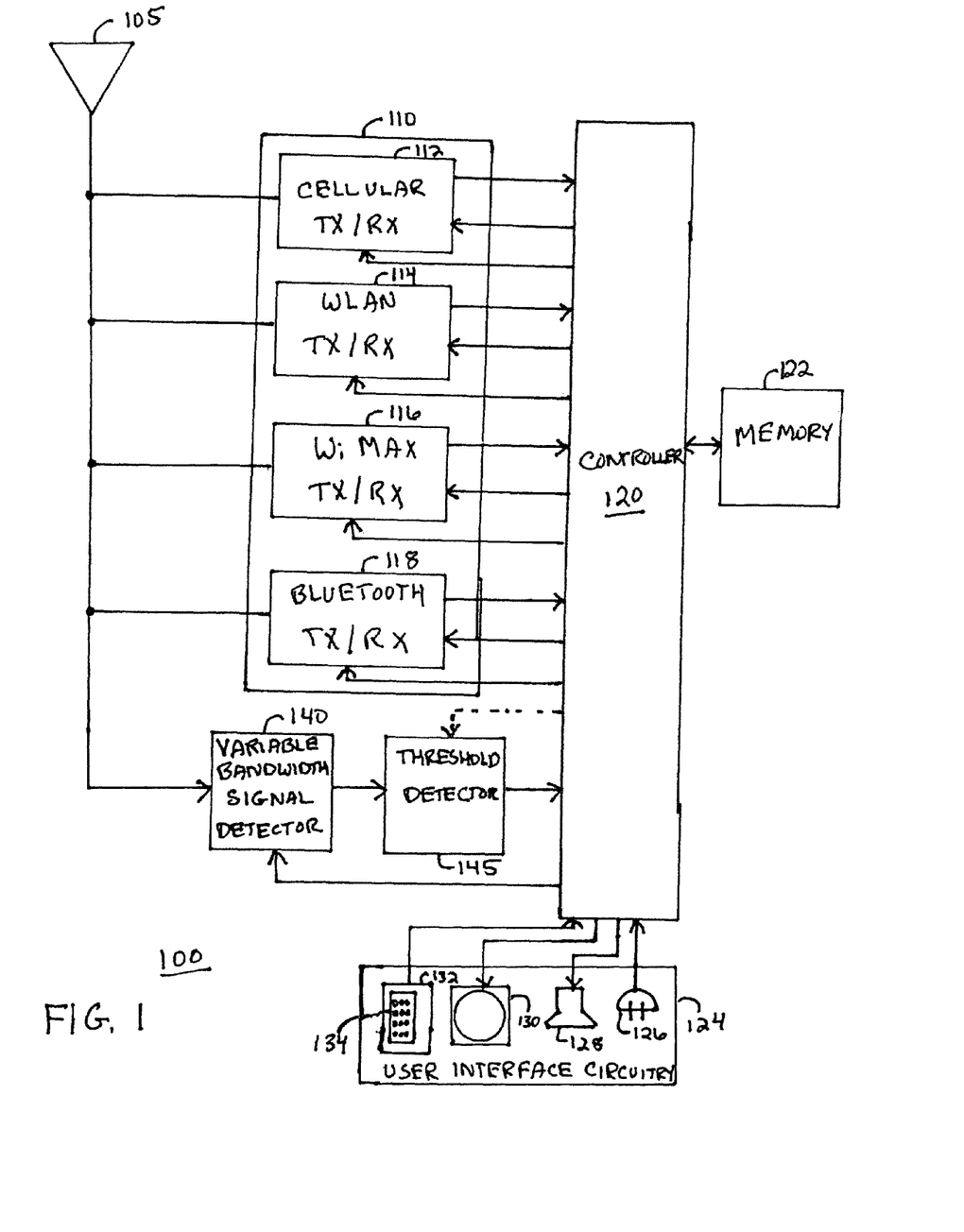
FIG. 1 is a block diagram of a multi-mode radio frequency (RF) communication device 100 in accordance with a first embodiment of the present invention.

Referring to FIG. 1, a multi-mode radio frequency (RF) wireless communication device 100 in accordance with a first embodiment of the present invention is shown. The multi-mode wireless communication device 100 can operate in a plurality of networks, each of the plurality of networks being defined by a radio access technology such as cellular telephone signaling technologies (e.g., CDMA, GSM), alternative network technologies (e.g., WiMAX) or short range network technologies (e.g., WLAN, Bluetooth). The wireless communication device 100 includes an antenna system 105 coupled to transceiver circuitry 110 for communicating in the plurality of networks. The transceiver circuitry 110 includes a plurality of transceivers 112, 114, 116, 118 for receiving signals from the antenna system 105 and demodulating and decoding the RF signals in accordance with the radio access technologies to recover information therefrom, as well as encoding and modulating information in accordance with the radio access technologies to generate signals for transmitting as RF signals from the antenna system 105.

In FIG. 1, four transceivers are depicted: cellular transceiver 112, WLAN transceiver 114, Bluetooth transceiver 116 and WiMAX transceiver 118. These transceivers operate in a manner familiar to those skilled in the art and can be implemented as separate integrated circuits (ICs) added to a cellular telephone to provide additional communication modes (many such conventional ICs, such as WLAN transceiver ICs or Bluetooth transceiver ICs, are on the market as chipsets today), thereby enabling the multi-mode RF wireless communication device 100 to communicate in a plurality of radio access technologies. While four transceivers are depicted, there could be as few as two transceivers or as many transceivers as the phone can accommodate, limited only by economic and power design considerations. In addition, the antenna system 105 could be a single antenna with additional circuitry to provide reception and transmission of RF signals at frequencies of the various networks or two or more antennas, each tuned to receive and transmit RF signals at frequencies in accordance with one or more of the radio access technologies.

The transceiver circuitry 110 is coupled to a controller 120 such that each of the transceivers 112, 114, 116 and 118 provide the decoded information to the controller for utilization thereby in accordance with the function(s) of the wireless communication device 110. The controller 120 also provides information to each of the transceivers 112, 114, 116 and 118 for encoding and modulating information thereby for transmission from the antenna 105. The controller 120 also provides control signals to the transceivers 112, 114, 116 and 118 to activate and deactivate each of the transceivers 112, 114, 116 and 118 as communication is enabled across one of the plurality of networks.

As is well-known in the art, the controller 120 is typically coupled to a memory device 122 and a user interface 124 to perform the functions of the wireless communication device 100. The user interface 124 includes user input and output devices such as a microphone 126, a speaker 128, a display 130 (which may be designed to accept touch screen inputs) and one or more key inputs 132, including, for example, a keypad 134.

In accordance with the first embodiment of the present invention, the wireless communication device 100 further includes a variable bandwidth signal detector 140 coupled to the antenna system 105 for receiving RF signals within a detection frequency bandwidth defined by programmable analog filters thereof. The variable bandwidth signal detector 140 is coupled to a threshold detector 145 for providing signals received within the detection bandwidth thereto. The variable bandwidth signal detector 140 is also coupled to the controller 120 for receiving control signals therefrom for controlling operation thereof in accordance with the present invention, as described in more detail with reference to FIG. 2 below. The threshold detector 145 provides a detection signal to the controller 120 in response to determining whether a signal is present within the detection bandwidth having a signal strength greater than a predetermined signal strength.

Figure 2:
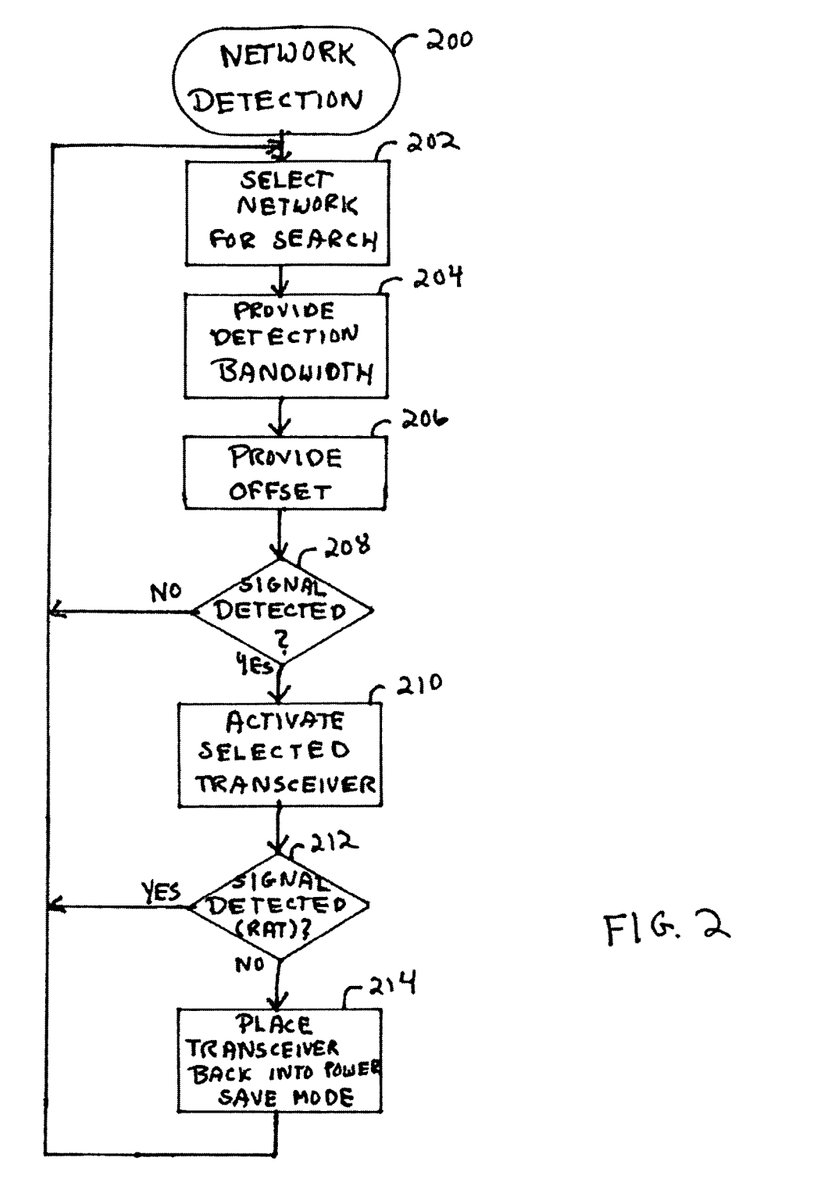
FIG. 2 is a flow diagram of a network detection operation of the controller 120 of FIG. 1 in accordance with the first embodiment of the present invention.

Referring next to FIG. 2, a flow chart of the optimized network detection operation 200 of the controller 120 in accordance with the first embodiment of the present invention is described. The network detection operation could be triggered in response to detection of a low signal strength of an active network signal indicative of imminent loss of signal. Alternatively, the network detection operation could be performed in the background while communicating on one network to identify a more preferable network for communication (i.e., more preferable in the sense of power savings or more preferable as indicated by a user structured or factory set priority scheme). For example, if a WLAN network signal is available for communications, the WLAN is a more preferable network than a cellular network because typically the cost of communications over a WLAN network is less expensive for the user than communication over a cellular network. Thus, initially, the controller 120 selects one of the plurality of networks to search for an active network signal 202.

Next, the controller 120 provides control signals to the variable bandwidth signal detector 140 to adjust the bandwidth by reducing the bandwidth from a typical decode bandwidth to a detection bandwidth 204 and to define an offset of a center of the detection bandwidth 206 in accordance with the selected network signal. In accordance with the present invention, the detection bandwidth is a reduced bandwidth defined in response to predetermined spectral characteristics of the selected network signal and is preferably a bandwidth of less than or equal to two megahertz. Likewise, the offset is determined in response to the predetermined spectral characteristics of the selected network signal and is preferably an offset of between four hundred kilohertz and two megahertz from the center of the detection bandwidth. In addition to the predetermined spectral characteristics, if there are any narrow band spurs generated by transmitter operations of an active transmitter, the offset is determined 206 in response to the predetermined spectral characteristics of the selected network signal and any generated narrow band spurs. Further, for multi-carrier network signals, such as orthogonal frequency domain multiplexed (OFDM) network signals, third generation (3G) code division multiple access (CDMA) network signals, and integrated digital enhanced network (iDEN) signals, which include subcarriers, the controller 120 provides control signals to the variable bandwidth signal detector 140 to define the detection bandwidth 204 and the offset of the center of the detection bandwidth 206 in accordance with the predetermined spectral characteristics of the subcarriers.

Figure 3:
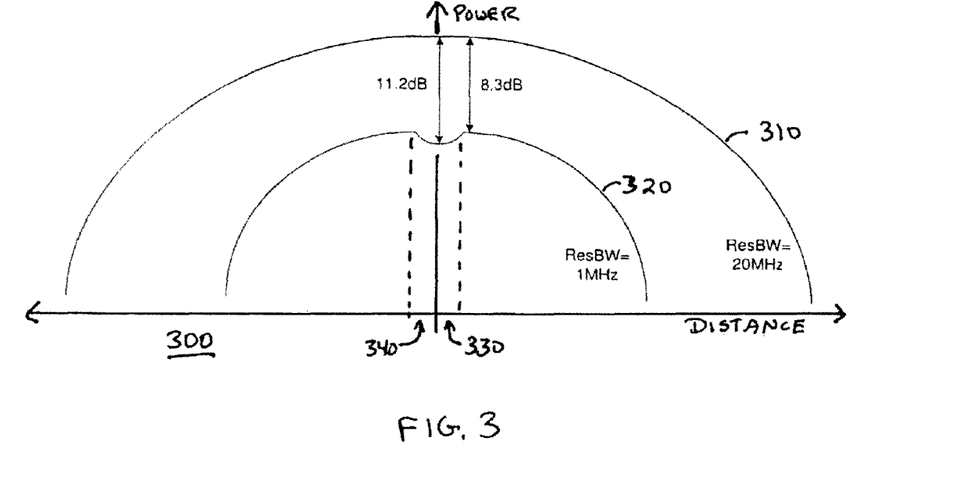
FIG. 3 is a graph of the measured signal power of a wideband local area network (WLAN) signal at a twenty megahertz (20 MHz) resolution and at a one megahertz (1 MHz) resolution.

For example, referring to FIG. 3, a graph 300 of measured signal power of a WLAN network beacon signal versus distance is shown. Curve 310 shows the WLAN network beacon signal as seen on a spectrum analyzer with a resolution bandwidth of twenty megahertz (20 MHz) and curve 320 shows the WLAN network beacon signal as seen on a spectrum analyzer with a resolution bandwidth of one megahertz (1 MHz). The predefined spectral characteristics of the WLAN network signal include an uneven content around the center of the reduced bandwidth curve 320. The optimal frequency portion of the WLAN network signal is the portion of the signal having a maximum signal-to-noise ratio which is determined as the maximum signal/(noise+interference). More specifically, the optimal frequency portion, or maximum power, of the WLAN network beacon signal is offset from the center of curve 320 by plus eight hundred kilohertz (800 KHz) 330 or minus eight hundred kilohertz (800 KHz) 340.

Thus, referring back to FIG. 2, when a WLAN network signal is selected for search 202, the controller 120 provides control signals to the variable bandwidth signal detector 140 to define a detection bandwidth 204 of 1 MHz. In addition, the controller 120 provides control signals to the variable bandwidth signal detector 140 to define an offset of a center of the detection bandwidth 206 of ±800 KHz in accordance with the predetermined spectral characteristics of the WLAN network signal so that the detection bandwidth includes the optimal frequency portion of the WLAN network signal. If there are any narrow band spurs generated by the WLAN transmitter operations that fall substantially at a −800 KHz offset, then the controller 120 provides control signals to the variable bandwidth signal detector 140 to define an offset of a center of the detection bandwidth 206 of +800 KHz in accordance with the predetermined spectral characteristics of the WLAN network signal and the generated narrow band spurs of the WLAN transmitter operations so that the detection bandwidth includes the optimal frequency portion of the WLAN network signal.

After the control signals are provided 204, 206 to the variable bandwidth signal detector 140, the controller checks the output of the threshold detector 145 to determine if a signal corresponding to the selected network has been detected 208. The threshold detector 145 detects a signal of the selected network in response to determining that a signal is present within the detection bandwidth having a signal strength greater than a predetermined signal strength. The predetermined signal strength could be a constant signal strength defined by the threshold detector 145 or could be a programmable value provided by the controller 120 (as indicated by the dotted arrow in FIG. 1) for the selected network.

If no signal is detected 208, processing returns to select the next network to search 202. If a signal is detected 208, the controller 120 activates the transceiver corresponding to the selected network to demodulate and decode the signal and provide it to the controller to determine if the detected signal is the selected network signal 212. If the detected signal is not the selected network signal 212, the transceiver is deactivated 214, placing it back in the power save or deep sleep mode, and processing returns to select the next network for search 202.

If the detected signal is the selected network signal 212, the transceiver remains active and processing returns to select the next network for search 202. At this point, if a communication is in process over one of the transceivers 112, 114, 116, 118, the controller 120 can begin conventional handoff operations to the newly detected network. Or, if communication is not in process, the controller can perform other operations (e.g., call initiation) well known to those skilled in the art.

The transceivers 112, 114, 116, 118 typically consume much more power than the variable bandwidth signal detector 140. Thus, it can be seen that operation in accordance with the present invention advantageously provides improved power savings by only "waking up" the transceiver from a deep sleep mode of operation when a signal having the predetermined spectral characteristics of the selected network signal optimal frequency portion thereof as defined by the variable bandwidth signal detector 140 is detected. In addition, improved power conservation can be obtained by activating the RF portion of the transceiver 112, 114, 116, 118 corresponding to the selected network when the network is selected at step 202 to allow for warm-up of the various analog components thereof while maintaining the digital decoder portion of the selected transceiver 112, 114, 116, 118 in "deep sleep" mode, thereby providing quicker performance of the activate step 210 and the signal detection step 212 when the threshold detector 145 detects a signal 208 because the digital decoder portions of the transceivers 112, 114, 116, 118 do not require the warm-up time required by the RF portions thereof. In a typical WLAN chip set, the inventors have obtained power reductions of more than fifty per cent (50%) by only activating the RF portions thereof.

Figure 4:
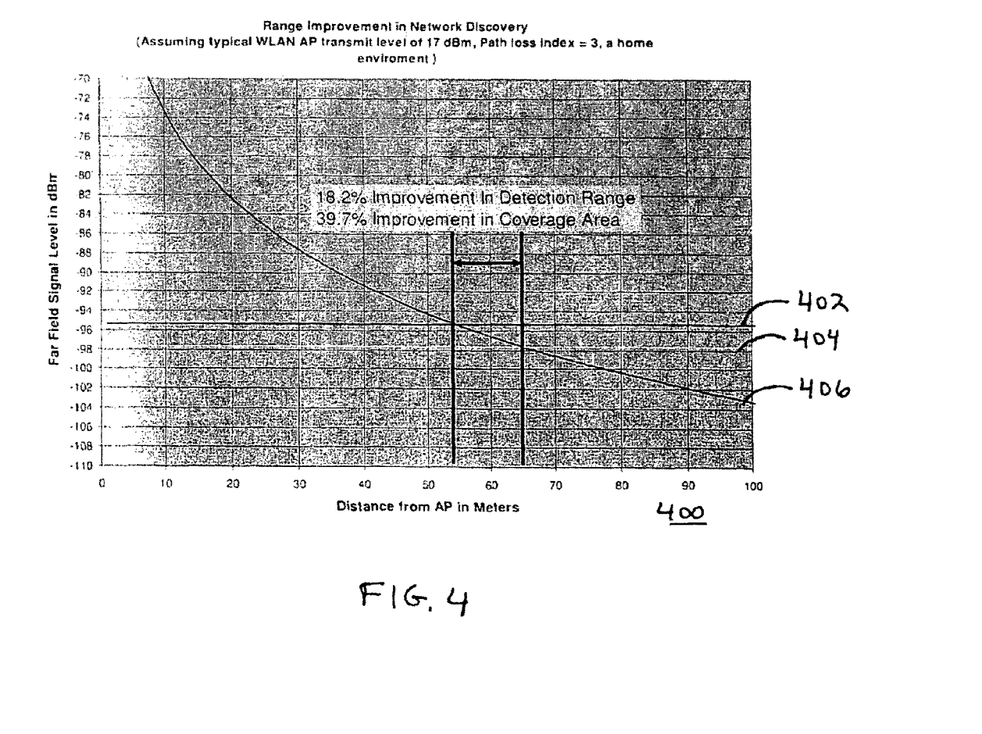
FIG. 4 is a graph depicting the network range improvement in accordance with the first embodiment of the present invention.

In addition, the network discovery range is increased as exemplified by the graph of FIG. 4. FIG. 4 depicts the detectable signal level versus the distance from a network access point (such a base station or network transceiver) in a typical WLAN network 400. Decreasing the detection bandwidth from 20 MHz to 1 MHz results in an approximately thirteen decibel (13 dB) reduction in noise. At the optimal frequency portion, the power measurement of the network signal (as seen in FIG. 3) decreases 8.3 dB. Therefore, the signal to noise ratio of the signal detection performed by the threshold detector is improved by 4.7 dB. Referring to FIG. 4, the thermal noise floor at a 20 MHz bandwidth is shown by horizontal line 402 and the reduced thermal noise floor at a 1 MHz bandwidth is shown by horizontal line 404. The transceiver power level (as shown by curve 406) evidences an increased WLAN network detection range of about eighteen per cent (18%), resulting in an approximately 40% increase in WLAN network coverage area. Increasing the network detection range increases the speed of network discovery, thereby allowing more time for network transition activities, such as preparation for handoff of an in-progress call.

Figure 5:
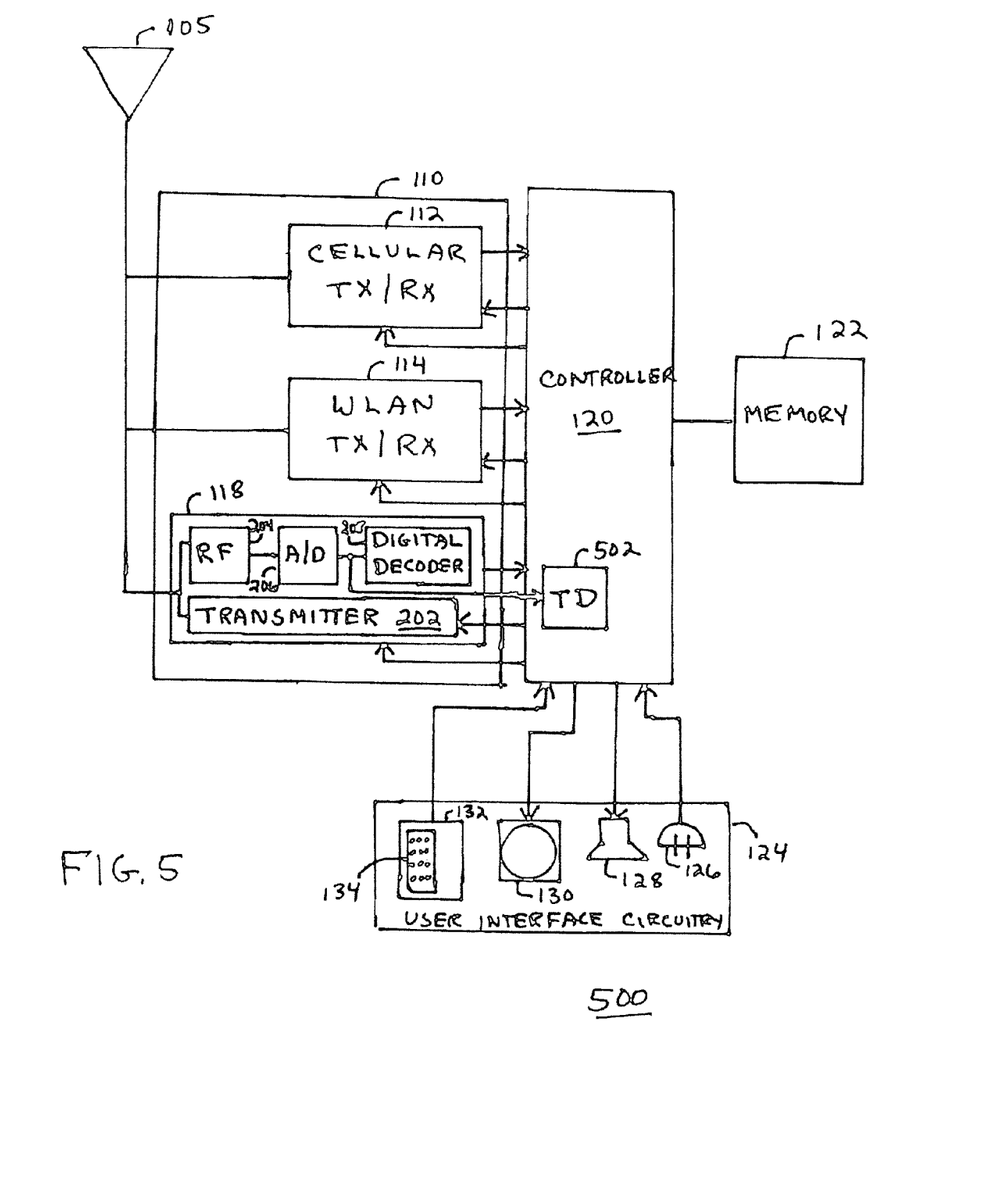
FIG. 5 is a block diagram of a multi-mode radio frequency (RF) communication device 500 in accordance with a second embodiment of the present invention.

Referring to FIG. 5, a multi-mode RF communication device 500 in accordance with a second embodiment of the present invention is disclosed. Transceiver circuitry 110 includes cellular transceiver 112, WLAN transceiver 114 and Bluetooth transceiver 118. In this second embodiment, the variable bandwidth signal detector 140 (FIG. 1) can be eliminated and lower power transceivers can be used for signal detection when the bandwidth coverage is appropriate. For example, the WLAN transceiver 114 and the Bluetooth transceiver 118 have overlapping network frequency coverage and the Bluetooth transceiver 118 (i.e., a lower power transceiver), which includes transmitter circuitry 202 and a receiver circuitry including a RF receiver portion 204 providing an output therefrom to an analog-to-digital (A/D) converter 206 which digitizes the signal for providing to a digital decoder 208, could be designed with programmable analog filters to have an adjustable bandwidth RF receiver portion 204. Thus, the function of variable bandwidth signal detection in accordance with the present invention could be performed by the Bluetooth transceiver's 118 RF receiver portion 204 and the A/D converter 206 for both Bluetooth network detection and WLAN network detection.

In accordance with the second embodiment of the present invention, the threshold detector 502 is implemented in the controller 120 such that the digital signal from the A/D 206 of the Bluetooth transceiver 118 is supplied to the threshold detector 502 portion of the controller 120 during network signal detection and the threshold detector 502 portion of the controller 120 determines whether a signal is present within the detection bandwidth having a signal strength greater than the predetermined signal strength.

Figure 6:
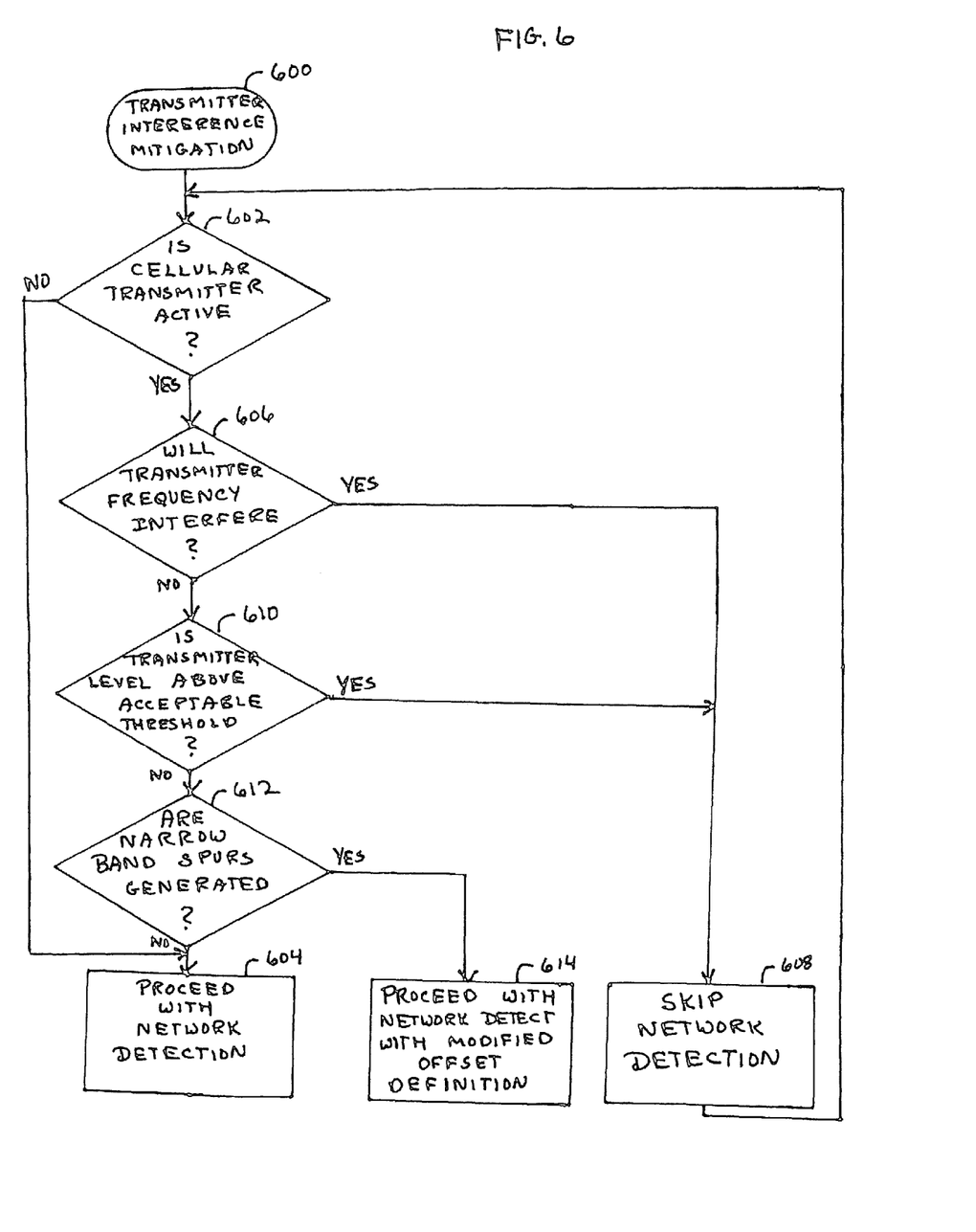
FIG. 6 is a flow diagram of a transmitter mitigation operation of the controller 120 of FIG. 1 in accordance with a third embodiment of the present invention.

Referring to FIG. 6, an additional operation 600 can be performed by the controller 120 before performing the network detection operation 200 to mitigate cellular transmitter interference therewith in accordance with a third embodiment of the present invention. Initially, the controller 120 determines whether the transmitter portion of the cellular transceiver 112 is active 602. If the cellular transmitter is not active 602, the network detection operation 200 is performed 604.

If, however, the cellular transmitter is active 602, the controller determines whether the cellular transmitter frequency will not affect the network detection operation 606. For example, if the cellular transmitter is operating at frequencies too far from the detection bandwidth to significantly affect signal detection, the network detection operation 200 will not be affected 606. If the controller 120 determines that the cellular transmitter frequency will affect the network detection operation 606, the network detection operation is not performed 608 and processing returns to check the cellular transmitter status 602.

When the controller 120 determines that the cellular transmitter frequency will not affect the network detection operation 606, processing next determines whether the cellular transmitter power level will not affect the network detection operation 610. For example, if the cellular transmitter is operating at power levels too low to significantly affect signal detection, the network detection operation 200 will not be affected 610. If the cellular transmitter power level is above the acceptable power threshold level 610, the network detection operation 200 is not performed 608 and processing returns to check the cellular transmitter status 602. If, on the other hand, the cellular transmitter power level is at or below an acceptable power threshold level 610, processing determines whether the transmitter portion of the cellular transceiver 112 generates narrow band spurs during operation 612. If the cellular transmitter is not generating narrow band spurs 603, the network detection operation 200 is performed 604. If the cellular transmitter is generating narrow band spurs 603, the network detection operation 200 is performed with a modified offset definition 614 wherein the offset is defined 206 (FIG. 2) in response to the predetermined spectral characteristics of the network signals and the generated narrow band spurs of the active cellular transmitter.

Thus, in accordance with the third embodiment of the present invention, the signal detection operation 200 can be paused when it is determined that the cellular transmitter may cause an erroneous or invalid signal detection. If, on the other hand, the cellular transmitter is not active or its operation will not significantly affect signal detection of the selected network signals, the signal detection operation 200 is performed.

Thus, by defining the predetermined signal strength for network detection to be above an environmental noise level, reducing the bandwidth to reduce in-band interference and offsetting the center of the detection bandwidth in response to network signal spectral characteristics to include the optimal frequency portion of the network signal, it can be seen that a multi-mode wireless communication device designed and operating in accordance with the present invention allows significant current drain reduction during network access and increases the network detection range, thereby increasing the speed of network discovery.

While several exemplary embodiments have been presented in the foregoing detailed description of the invention, it should be appreciated that a vast number of variations exist. It should also be appreciated that the exemplary embodiments are only examples and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their equivalents.

What is claimed is:

1. A method for detection of a network having a network signal with predetermined spectral characteristics, the method comprising the steps of:
   determining whether transmitter operations of one or more transmitters will significantly affect the signal detection;
   offsetting a center of a detection bandwidth for signal detection in response to the predetermined spectral characteristics of the network signal only when the transmitter operations will not significantly affect the signal detection; and
   determining whether a signal is present within the detection bandwidth having a signal strength greater than a predetermined signal strength.

2. The method of claim 1 further comprising the step of adjusting a bandwidth of a signal detector to the detection bandwidth in response to the spectral characteristics of the network signal.

3. The method of claim 2 wherein the step of adjusting the bandwidth comprises the step of reducing the bandwidth of the signal detector from a typical decode bandwidth to the detection bandwidth in response to the spectral characteristics of the network signal.

4. The method of claim 2 wherein the network signal is a wideband local area network (WLAN) signal and wherein the step of adjusting the bandwidth to the detection bandwidth comprises the step of adjusting the bandwidth of the signal detector to a bandwidth of less than or equal to two megahertz (≦2 MHz).

5. The method of claim 4 wherein the step of offsetting the center of the detection bandwidth comprises the step of offsetting the center of the detection bandwidth by between four hundred kilohertz and two megahertz (0.4 MHz to 2 MHz).

6. The method of claim 2 wherein the network signal is a multi-carrier signal including subcarriers and wherein the step of offsetting the center of the detection bandwidth comprises the step of offsetting the center of the detection bandwidth for signal detection in response to the predetermined spectral characteristics of the subcarriers, and wherein the step of adjusting the bandwidth of the signal detector comprises the step of adjusting the bandwidth of the signal detector to the detection bandwidth in response to the spectral characteristics of the subcarriers.

7. The method of claim 1 wherein the spectral characteristics of the network signal include an optimal frequency portion of the network signal, the optimal frequency portion of the network signal being a portion of the network signal having a maximum signal-to-noise ratio, and wherein the step of offsetting the center of the detection bandwidth comprises the step of offsetting the center of the detection bandwidth for signal detection in response to the optimal frequency portion of the network signal.

8. The method of claim 7 wherein the step of offsetting the center of the detection bandwidth for signal detection in response to the optimal frequency portion of the network signal comprises the step of offsetting the center of the detection bandwidth so that the detection bandwidth includes the optimal frequency portion of the network signal.

9. The method of claim 1 further comprising, before the step of offsetting the center of the detection bandwidth, the step of determining whether transmitter operations of one or more transmitters generate narrow band spurs, wherein the step of offsetting the center of the detection bandwidth comprises the step of offsetting the center of the detection bandwidth for the signal detection in response to the predetermined spectral characteristics of the network signal and any generated narrow band spurs.

10. The method of claim 1 wherein the step of determining whether transmitter operations will significantly affect the signal detection comprises the step of determining whether at least one of the one or more transmitters is active.

11. The method of claim 1 wherein the step of determining whether transmitter operations will significantly affect the signal detection comprises the step of determining whether at least one of the one or more transmitters is generating a signal with a frequency that will produce interfering signals in the detection bandwidth.

12. The method of claim 1 wherein the step of determining whether transmitter operations will significantly affect the signal detection comprises the step of determining whether at least one of the one or more transmitters is generating a signal with a power level above a predetermined acceptable transmitter power level.

13. The method of claim 1 further comprising the step of decoding the signal to detect the network in response to determining that a signal is present within the detection bandwidth having a signal strength greater than the predetermined signal strength.

14. A wireless communication device for operating in a plurality of networks, each of the plurality of networks having a network signal with predetermined spectral characteristics, the wireless communication device comprising:
   a variable bandwidth signal detector receiving radio frequency (RF) signals and defining a detection bandwidth for signal detection;
   a threshold detector coupled to the variable bandwidth signal detector and detecting a network signal within the RF signals in response to determining whether a signal is present within the detection bandwidth having a signal strength greater than a predetermined signal strength;
   a controller coupled to the variable bandwidth signal detector and the threshold detector, the controller offsetting a center of the detection bandwidth of the variable bandwidth signal detector in response to the predetermined spectral characteristics of the network signal; and
   transceiver circuitry including one or more transmitters for performing transmitter operations, and wherein the controller is coupled to the transceiver circuitry and determines whether the transmitter operations will significantly affect the signal detection and offsets the center of the detection bandwidth in response to the predetermined spectral characteristics of the network signal only when the transmitter operations will not significantly affect the signal detection.

15. The wireless communication device of claim 14 wherein the controller additionally adjusts a bandwidth of the variable bandwidth signal detector to the detection bandwidth in response to the spectral characteristics of the network signal.

16. The wireless communication device of claim 15 wherein the spectral characteristics of the network signal include an optimal frequency portion of the network signal, the optimal frequency portion of the network signal being a portion of the network signal having a maximum signal-to-noise ratio, and wherein the controller adjusts the bandwidth of the variable bandwidth signal detector to the detection bandwidth in response to the optimal frequency portion of the network signal.

17. The wireless communication device of claim 15 wherein the RF signals are multicarrier signals including subcarriers and wherein the controller offsets the center of the detection bandwidth of the variable bandwidth signal detector in response to the predetermined spectral characteristics of the subcarriers and, additionally, adjusts the bandwidth of the variable bandwidth signal detector to the detection bandwidth in response to the spectral characteristics of the subcarriers.

18. The wireless communication device of claim 14 wherein the spectral characteristics of the network signal include an optimal frequency portion of the network signal, the optimal frequency portion of the network signal being a portion of the network signal having a maximum signal-to-noise ratio, and wherein the controller offsets the center of the detection bandwidth of the variable bandwidth signal detector in response to the optimal frequency portion of the network signal.

19. The wireless communication device of claim 18 wherein the controller offsets the center of the detection bandwidth of the variable bandwidth signal detector so that the detection bandwidth includes the optimal frequency portion of the network signal.

20. The wireless communication device of claim 14 further comprising transceiver circuitry including one or more transmitters for performing transmitter operations, and wherein the controller is coupled to the transceiver circuitry and determines whether the transmitter operations generate narrow band spurs and offsets the center of the detection bandwidth in response to the predetermined spectral characteristics of the network signal and any generated narrow band spurs.

21. The wireless communication device of claim 14 wherein the controller determines whether the transmitter operations will significantly affect the signal detection in response to determining whether at least one of the one or more transmitters is active.

22. The wireless communication device of claim 14 wherein the controller determines whether the transmitter operations will significantly affect the signal detection in response to determining whether at least one of the one or more transmitters is generating a signal with a frequency that will produce interfering signals in the detection bandwidth.

23. The wireless communication device of claim 14 wherein the controller determines whether the transmitter operations will significantly affect the signal detection in response to determining whether at least one the one or more transmitters is generating a signal with a power level above a predetermined acceptable transmitter power level.

24. The wireless communication device of claim 14 further comprising transceiver circuitry coupled to the controller and decoding the network signal to detect the network, wherein the controller conserves power during network detection by activating the transceiver circuitry to decode the signal to detect the network in response to the threshold detector determining that a signal is present within the detection bandwidth having a signal strength greater than the predetermined signal strength.

25. The wireless communication device of claim 14 wherein the transceiver circuitry comprises a plurality of transceivers, each of the plurality of transceivers tuned to receive a network signal from a corresponding one of the plurality of networks, and wherein the controller is coupled to each of the plurality of transceivers and further conserves power during network detection of one of the plurality of networks by activating one of the plurality of transceivers not corresponding to the one of the plurality of networks to function as the variable bandwidth signal detector.

26. A multi-mode radio frequency (RF) communication device for operating in a plurality of networks, each of the plurality of networks being defined by a radio access technology having a network signal with predetermined spectral characteristics, the multi-mode RF communication device comprising:
    transceiver circuitry receiving network signals from the plurality of networks and decoding the network signals to detect one of the plurality of networks;
    a variable bandwidth signal detector receiving network signals and defining a detection bandwidth for network signal detection;
    a threshold detector coupled to the variable bandwidth signal detector and determining whether a signal is present within the detection bandwidth having a signal strength greater than a predetermined signal strength; and
    a controller coupled to the variable bandwidth signal detector, the threshold detector and the transceiver circuitry, the controller adjusting a bandwidth of the variable bandwidth signal detector to the detection bandwidth and offsetting a center of the detection bandwidth of the variable bandwidth signal detector in response to the predetermined spectral characteristics of the network signal, and wherein the controller further conserves power during network detection by activating the transceiver circuitry in response to the threshold detector determining that a signal is present within the detection bandwidth having a signal strength greater than the predetermined signal strength.

27. The multi-mode RF communication device of claim 26 wherein the transceiver circuitry comprises a plurality of transceivers, each of the plurality of transceivers tuned to receive a network signal from a corresponding one of the plurality of networks, and wherein the controller is coupled to each of the plurality of transceivers and conserves power during network detection of one of the plurality of networks by activating one of the plurality of transceivers not corresponding to the one of the plurality of networks, the one of the plurality of transceivers being tuned to receive a network signal within frequencies overlapping at least a portion of frequencies of the one of the plurality of networks including the predetermined spectral characteristics thereof.

28. The multi-mode RF communication device of claim 26 wherein one of the plurality of networks is a wideband local area network (WLAN), and wherein the controller adjusts the bandwidth of the variable bandwidth signal detector to a bandwidth of less than or equal to two megahertz ($\leq 2$ MHz) and offsets the center of the detection bandwidth of the variable bandwidth signal detector by between four hundred kilohertz and two megahertz (0.4 to 2 MHz) for network detection of the WLAN.

29. The multi-mode RF communication device of claim 28 wherein the controller adjusts the bandwidth of the variable bandwidth signal detector to a bandwidth of one megahertz (1 MHz) and offsets the center of the detection bandwidth of the variable bandwidth signal detector by eight hundred kilohertz (800 KHz) for network detection of the WLAN.

* * * * *